US012033539B2

(12) United States Patent
Powhida et al.

(10) Patent No.: US 12,033,539 B2
(45) Date of Patent: Jul. 9, 2024

(54) PRIVACY LABEL SYSTEM AND METHOD OF PROTECTING PRIVACY

(71) Applicant: Privacy Tab, LLC, Niskayuna, NY (US)

(72) Inventors: Scott Powhida, Delmar, NY (US); Larry Frederick, Niskayuna, NY (US)

(73) Assignee: PRIVACY TAB, LLC, Niskayuna, NY (US)

( * ) Notice: Subject to any disclaimer, the term of this patent is extended or adjusted under 35 U.S.C. 154(b) by 0 days.

(21) Appl. No.: 18/159,140

(22) Filed: Jan. 25, 2023

(65) Prior Publication Data

US 2023/0162624 A1 May 25, 2023

Related U.S. Application Data

(63) Continuation of application No. 17/816,538, filed on Aug. 1, 2022, which is a continuation of application
(Continued)

(51) Int. Cl.
*G09F 1/10* (2006.01)
*G09F 3/00* (2006.01)
(Continued)

(52) U.S. Cl.
CPC .............. *G09F 3/0289* (2013.01); *G09F 3/10* (2013.01); *G09F 2003/0222* (2013.01);
(Continued)

(58) Field of Classification Search
CPC ............. G09F 3/0289; G09F 2003/023; G09F 2003/10258; Y10T 428/14; C09J 7/38; C09J 7/334
See application file for complete search history.

(56) References Cited

U.S. PATENT DOCUMENTS 1,949,903 A 3/1934 Fales
4,278,199 A 7/1981 Tanaka
(Continued)

FOREIGN PATENT DOCUMENTS

CA 2495171 2/2004
JP 2005189613 12/2003
(Continued)

OTHER PUBLICATIONS

Office Action issued in U.S. Appl. No. 17/816,538 dated Oct. 2, 2023, 16 pgs.

*Primary Examiner* — Cassandra Davis
(74) *Attorney, Agent, or Firm* — Heslin Rothenberg Farley & Mesiti P.C.

(57) ABSTRACT

A privacy label system includes a sheet of label material configured to be removably attached to a container of a product in an unfolded layer configuration. The label material includes a top surface area configured to receive personal information of a recipient of the product and an opposing bottom surface area configured to receive advertising information associated with the product. An attachment system of the privacy label system is operable to removably attach the label material to the container in an unfolded layer configuration such that the bottom surface area is positioned between the top surface area and the container, once the label material is attached to the container. The label material is operable to be removed from the container by the recipient by hand, in order to remove the personal information from the container and to reveal the advertising information to the recipient.

18 Claims, 10 Drawing Sheets

Related U.S. Application Data

No. 17/646,956, filed on Jan. 4, 2022, now Pat. No. 11,410,577.

(60) Provisional application No. 63/171,209, filed on Apr. 6, 2021.

(51) Int. Cl.
*G09F 3/10* (2006.01)
*G09F 3/02* (2006.01)

(52) U.S. Cl.
CPC .................. *G09F 2003/023* (2013.01); *G09F 2003/0258* (2013.01); *G09F 2003/0269* (2013.01); *G09F 2003/0272* (2013.01)

(56) References Cited

U.S. PATENT DOCUMENTS

| | | | | |
|---|---|---|---|---|
| 4,318,235 | A | 3/1982 | Augeri | |
| 4,430,816 | A | 2/1984 | Seton et al. | |
| 4,842,303 | A | 6/1989 | Molenda | |
| 4,991,878 | A | 2/1991 | Cowan et al. | |
| 5,267,898 | A | 12/1993 | Doll et al. | |
| 5,340,158 | A | 8/1994 | Bartl | |
| 5,547,227 | A | 8/1996 | Laurash et al. | |
| RE37,521 | E | 1/2002 | Laurash et al. | |
| 6,358,607 | B1 | 3/2002 | Grotzner | |
| 6,616,189 | B2 * | 9/2003 | Raming | G09F 3/10 283/81 |
| 7,055,273 | B2 | 6/2006 | Roshkoff | |
| 7,153,556 | B2 | 12/2006 | McKillip | |
| 7,568,613 | B1 | 8/2009 | Dillon et al. | |
| 7,823,726 | B1 | 11/2010 | Miceli et al. | |
| 8,065,827 | B2 | 11/2011 | Regas | |
| 9,607,530 | B2 | 3/2017 | Valenti, Jr. | |
| 10,464,697 | B1 | 11/2019 | Miceli et al. | |
| 10,918,570 | B1 * | 2/2021 | Hincher, Sr. | A61J 1/00 |
| 2002/0193225 | A1 | 12/2002 | Raming | |
| 2004/0108237 | A1 | 6/2004 | McClintock | |
| 2006/0028014 | A1 | 2/2006 | McQueeny et al. | |
| 2006/0257607 | A1 | 11/2006 | Crooks et al. | |
| 2007/0095706 | A1 | 5/2007 | Legault et al. | |
| 2007/0234615 | A1 | 10/2007 | Pendzich | |
| 2008/0163527 | A1 | 7/2008 | Ahmed | |
| 2009/0223099 | A1 | 9/2009 | Versteeg | |
| 2010/0324920 | A1 | 12/2010 | Sullivan et al. | |
| 2014/0259835 | A1 | 9/2014 | Plak et al. | |
| 2014/0332434 | A1 | 11/2014 | Regas | |
| 2016/0189573 | A1 | 6/2016 | Bush | |
| 2019/0139458 | A1 | 5/2019 | Parker | |
| 2019/0263168 | A1 | 8/2019 | Abood et al. | |

FOREIGN PATENT DOCUMENTS

| | | |
|---|---|---|
| JP | 2009217285 | 6/2009 |
| KR | 100872785 | 5/2007 |
| KR | 20120031225 | 3/2012 |

* cited by examiner

PRIVACY LABEL SYSTEM AND METHOD OF PROTECTING PRIVACY

CROSS-REFERENCE TO RELATED APPLICATIONS

This application is a continuation of, and claims priority to, U.S. patent application Ser. No. 17/816,538 filed on Aug. 1, 2022, which claims the benefit of the filing date of U.S. patent application Ser. No. 17/646,956 filed on Jan. 4, 2022, which claims the benefit of the filing date of U.S. provisional application 63/171,209 filed on Apr. 6, 2021. The contents of the prior applications are hereby incorporated by reference herein in their entirety.

TECHNICAL FIELD

The present disclosure relates to labels and methods of protecting privacy. More specifically, the disclosure relates to privacy label systems configured to be removably attached to a container of a product and methods of protecting privacy of a recipient of the product.

BACKGROUND

Labels are often attached to containers of products that are to be shipped or delivered to a recipient of the product. The labels may have personal information of the recipient printed thereon in order to associate the product with the recipient. Such personal information may include a recipient's name, address, phone number or the like.

For example, the labels may be attached to such containers as shipping boxes or envelopes that are to be shipped via courier to the address of the recipient. Also by way of example, the containers may be pharmacy prescription vials or bottles, which contain medications that a recipient intends to pick up at a local pharmacy.

However, a recipient may want to remove the personal information for privacy reasons, once the recipient obtains possession of the product. Problematically, if the label is permanently affixed to the container, the recipient may not be able to easily remove the information from the container without damaging or disposing of the container.

Additionally, manufactures or distributors of the product often want to provide advertising information associated with the product directly to the recipient once the recipient obtains possession of the product. The labels represent a prime area for advertisement associated with the product, since the recipient must focus his or her attention on the labels at least once when taking possession of the container. However, adding advertising information to the label along with the personal information required to identify the recipient will inevitably make the footprint of the label grow in size. This could be especially problematic when the containers are small like, for example, a one inch diameter pharmacy prescription vial.

Accordingly, there is a need for a label system that enables personal information to be removed from a container without damaging the container. Additionally, there is a need for a label system that can provide advertising information on the label system without increasing the footprint of the label system.

BRIEF DESCRIPTION

The present disclosure offers advantages and alternatives over the prior art by providing a privacy label system that includes a single sheet of label material that can be removably attached to a container of a product. The label material has a top surface area and a bottom surface area. The top surface area is configured to receive personal information of a recipient of the product. The bottom surface area is configured to receive advertisement information associated with the product. The label system also includes an attachment system that is operable to removably attach the label material to the container in an unfolded single layer configuration. The privacy label system enables a recipient to view his or her personal information prior to removing the label material from the container. Additionally, privacy label system enables the advertising information to be revealed to the recipient once the label material is removed from the container. Because the advertising information is disposed on the bottom surface of the label material, the footprint of the label material does not grow. Additionally, because the label material is attached in an unfolded single layer configuration onto the container, the label system can be made small to fit such small containers as small diameter pharmacy prescription vials or small envelopes.

A privacy label system in accordance with one or more aspects of the present disclosure includes a sheet of label material configured to be removably attached to a container of a product in an unfolded layer configuration. The label material includes a top surface area and an opposing bottom surface area. The top surface area is configured to receive personal information of a recipient of the product. The bottom surface area is configured to receive advertising information associated with the product. An attachment system of the privacy label system is operable to removably attach the label material to the container in an unfolded layer configuration such that the bottom surface area is positioned between the top surface area and the container, once the label material is attached to the container. The label material is operable to be removed from the container by the recipient by hand, in order to remove the personal information from the container and to reveal the advertising information to the recipient.

Another privacy label system in accordance with one or more aspects of the present disclosure includes a sheet of label material configured to be removably attached to a container of a product in an unfolded layer configuration. The label material includes a top surface area and an opposing bottom surface area. The top surface area is configured to receive personal information of a recipient of the product. The opposing bottom surface area is configured to receive advertising information associated with the product. An attachment system of the privacy label system is operable to removably attach the label material to the container in an unfolded layer configuration such that the bottom surface area is positioned between the top surface area and the container, once the label material is attached to the container. A tab section of the privacy label system is attached to the label material. The tab section is configured to be pulled by hand to remove the attached label material from the container. The label material is operable to be removed from the container by the recipient pulling the tab section by hand, in order to remove the personal information from the container and to reveal the advertising information to the recipient.

A method of protecting privacy of a recipient of a product in accordance with one or more aspects of the present disclosure includes providing a privacy label system. The privacy label system has a sheet of label material configured to be removably attached to a container of a product in an unfolded layer configuration. Personal information of a recipient of the product is disposed on a top surface area of the label material. Advertising information associated with the product is disposed on an opposing bottom surface area of the label material. An attachment system of the privacy label system is attached to the container. The attachment system removably attaches the label material to the container in an unfolded layer configuration such that the bottom surface area is positioned between the top surface area and the container, once the label material is attached to the container. The label material of the privacy label system is removed from the container by the recipient by hand, in order to remove the personal information from the container and to reveal the advertising information to the recipient.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

DRAWINGS

The disclosure will be more fully understood from the following detailed description taken in conjunction with the accompanying drawings, in which:

FIG. 1 depicts an example of a top view of a privacy label system configured to be removably attached to a container of a product, the system includes a single sheet of label material and an attachment system, the label material includes a top surface area with personal information of a recipient of the product thereon and a bottom surface area with advertising information associated with the product thereon, the attachment system is configured to removably attach the label material to the container, according to aspects described herein;

Figure 9:
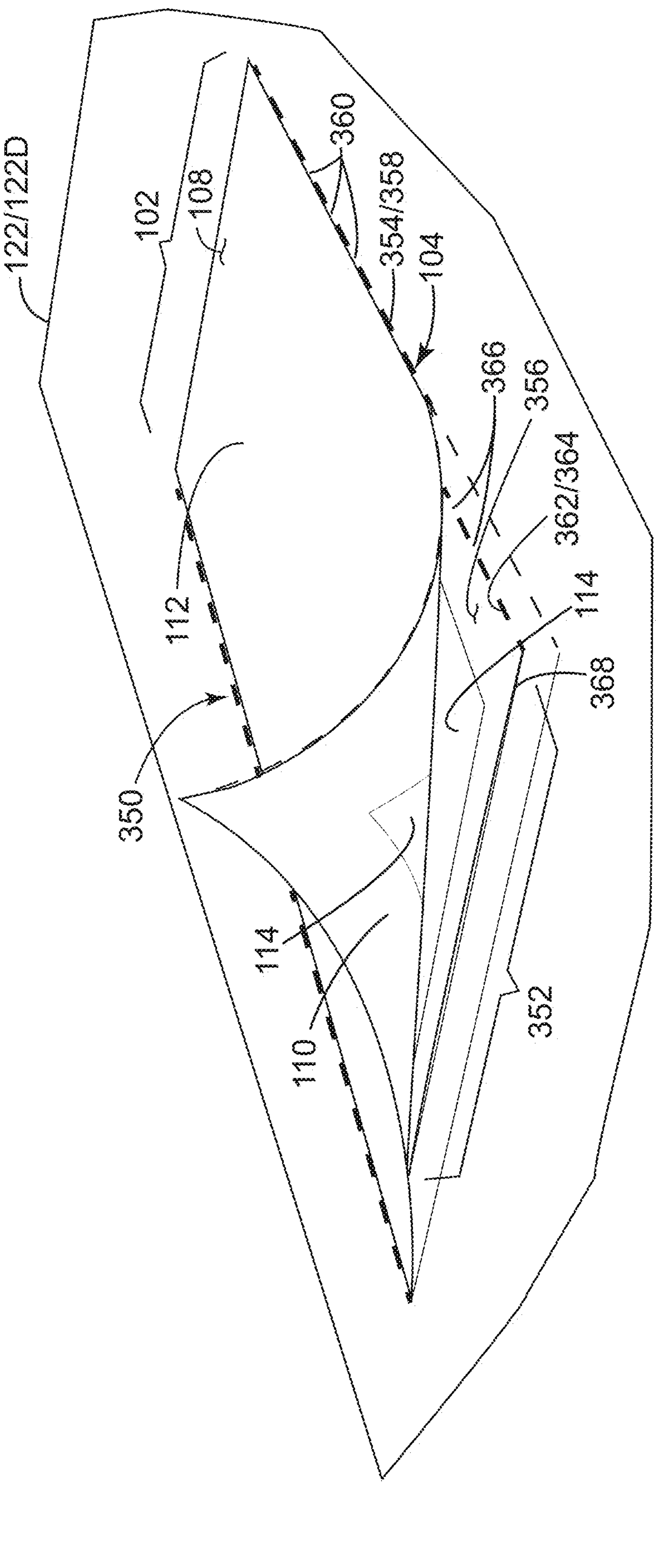
Figure 10:
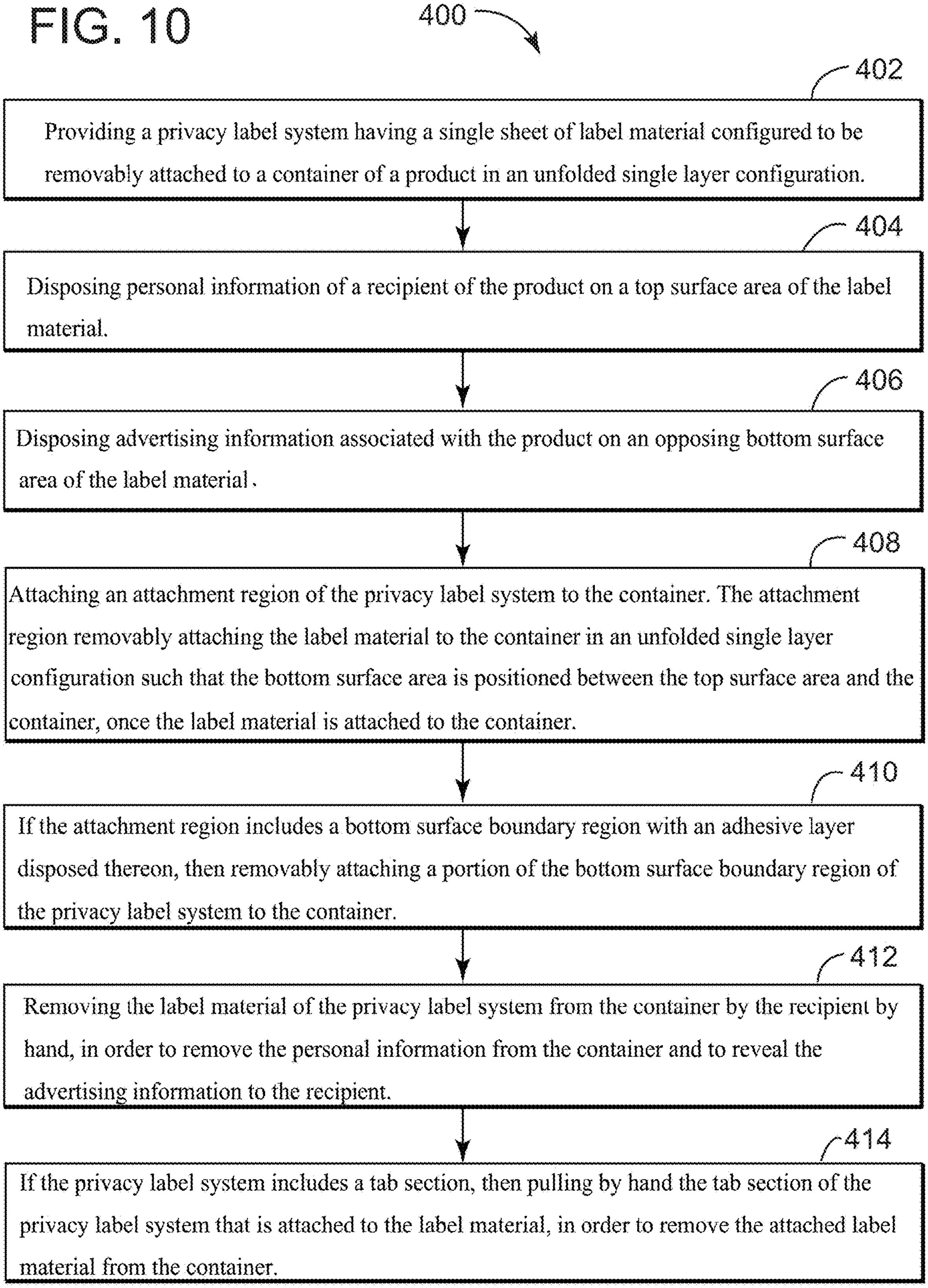
Figure 11:
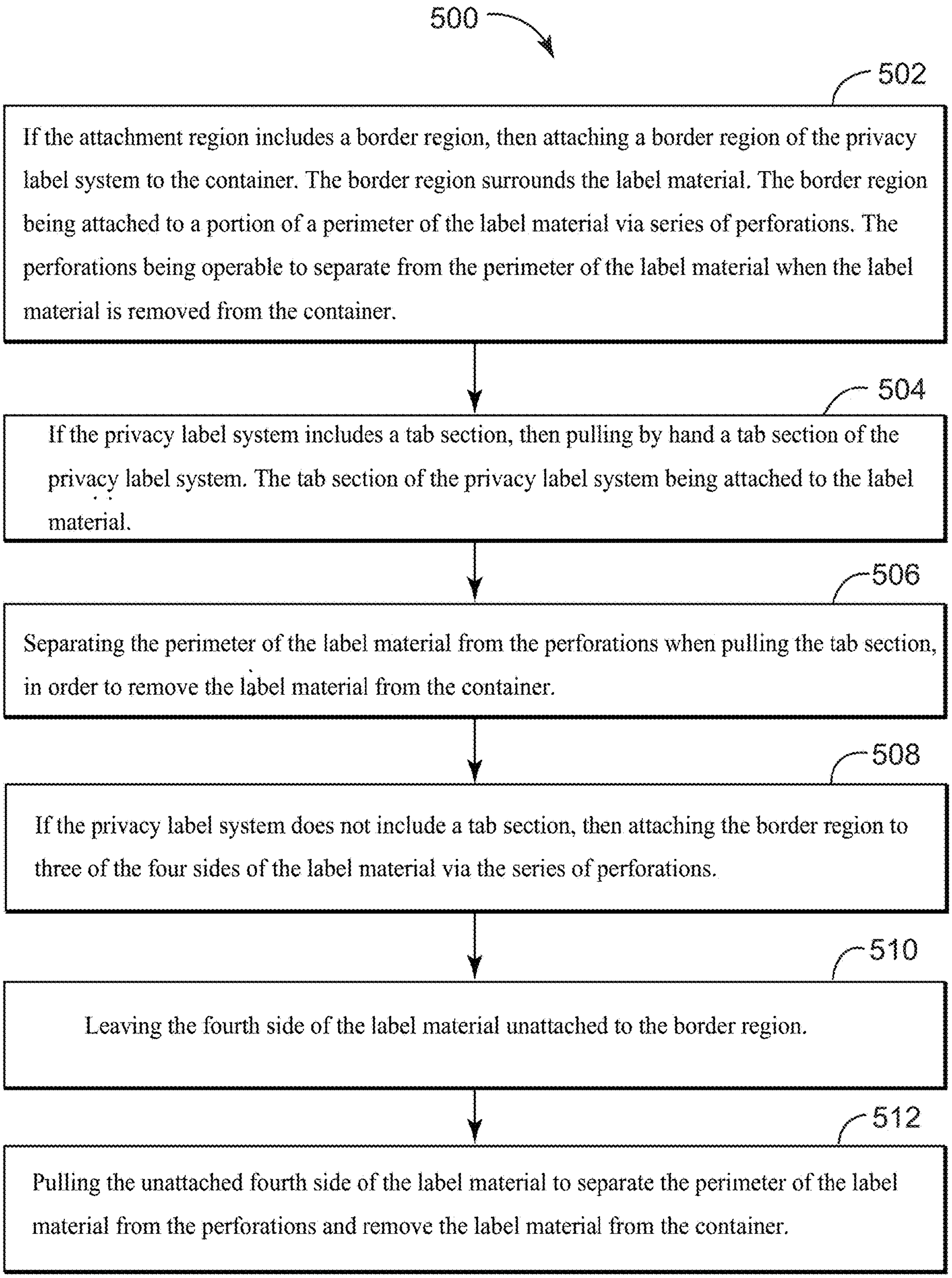

FIG. 9 depicts an example of a perspective view of a privacy label system configured to be removably attached to a container, wherein the container is a box, and wherein the privacy label system includes a single layer single sheet top first label material and a single layer single sheet second label material positioned directly adjacent and below the first label material, according to aspects described herein;

FIG. 10 depicts an example of a flow diagram of a method of protecting privacy of a recipient of a product, according to aspects described herein; and FIG. 11 depicts an example of another flow diagram of a method of protecting privacy of a recipient of a product, according to aspects described herein.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example maybe combined with the features of other examples. Such modifications and variations are intended to be included within the scope of the present disclosure.

The terms “significantly”, “substantially”, “approximately”, “about”, “relatively,” or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
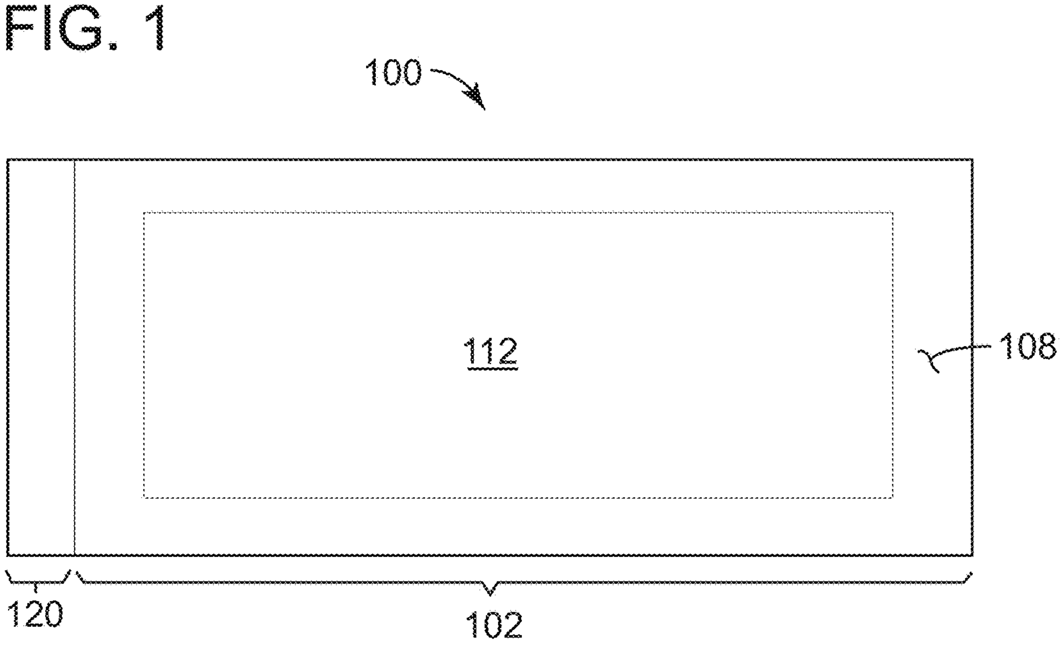
Figure 2:
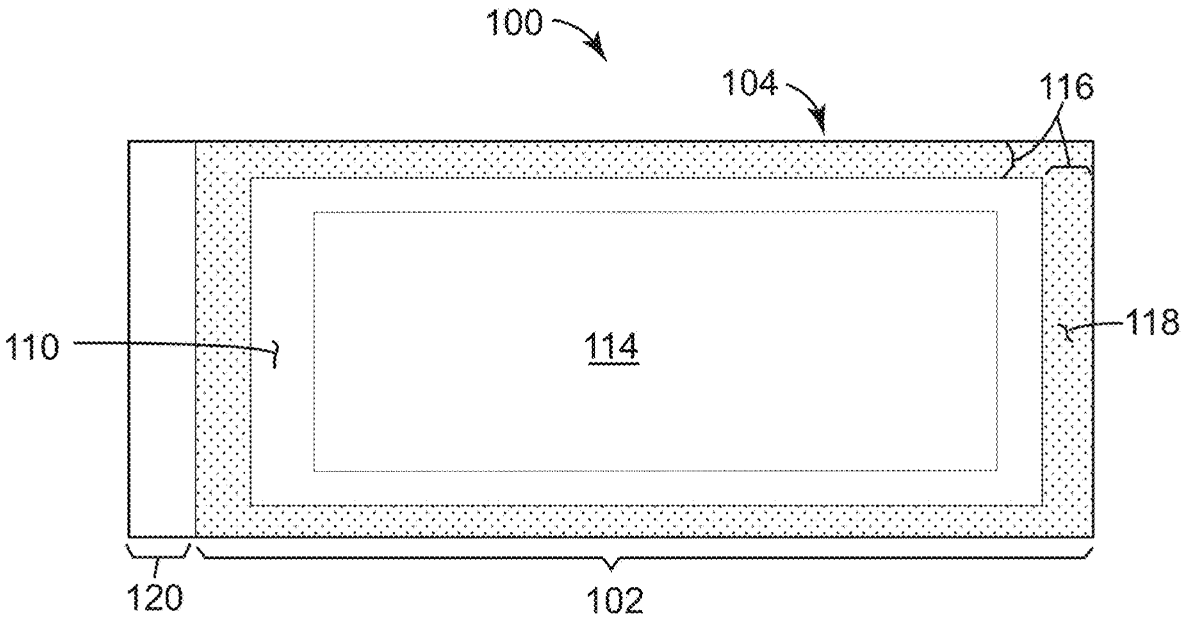
FIG. 2 depicts an example of a bottom view of the privacy label system of FIG. 1, according to aspects describe herein.
Figure 3:
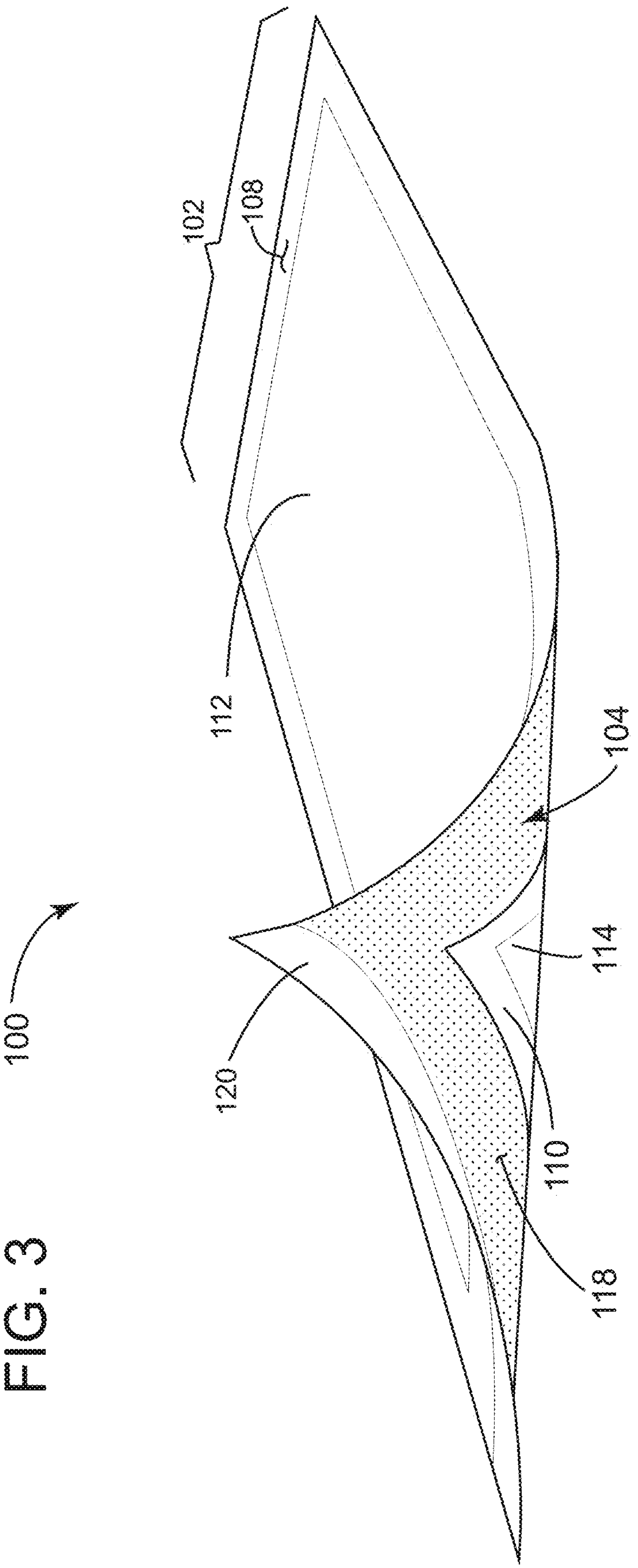
FIG. 3 depicts an example of a perspective view of the privacy label system of FIG. 1, according to aspects describe herein.

Referring to FIGS. 1, 2 and 3, an example is depicted of a top view (FIG. 1), a bottom view (FIG. 2) and a perspective view (FIG. 3) of a privacy label system 100 configured to be removably attached to a container 122 (see FIG. 4) of a product 124 (see FIG. 4), according to aspects describe herein. The privacy label system 100 includes at least a single sheet (or single first sheet) of single layer label material 102, an attachment system 104 and optionally a tab section 120.

The single sheet of single layer label material 102 is configured to be removably attached to a container 122 of a product 124 in an unfolded single layer configuration. That is, the label material 102 is configured to attach to the container 122 such that it lays flat against or over the container 122 as a single sheet, wherein the single sheet is comprised of a single layer of label material, and does not fold into a plurality of layers of the single sheet upon attachment. As will be discussed in greater detail herein, being able to attach in an unfolded configuration advantageously reduces the size and cost of the privacy label system 100 and makes the system 100 more practically applicable to smaller containers 122. Examples of such small containers 122 would be small pharmacy prescription vials 122A (see FIG. 4) having an outside diameter of one inch or less, or small envelops 122C (see FIG. 7) having dimensions of four and one eighth (4⅛) inches or less by nine and one half (9½) inches or less. The label material 102 may be any single layer, single sheet material appropriate for attachment to a container 122 for purposes of shipping or transporting the container 122. The label material 102 may also be any material appropriate for printing information thereon. By way of example, the label material 102 may be paper, plastic or the like.

The label material 102 includes a top surface area 108 and an opposing bottom surface area 110. The top surface area 108 is configured to receive personal information 112 of a recipient 126 (see FIG. 4) of the product 124 (see FIG. 4). The opposing bottom surface area 110 is configured to receive advertising information 114 associated with the product 124 or personally directed to the recipient 126. For example, the top surface area 108 may have printed thereon such personal information 112 as the name, address, phone number or the like of the recipient 126. Also by way of example, the bottom surface area 110 may have printed advertisement information 114 regarding the manufacturer or distributor of the product, or may contain advertisements regarding the product itself or related products that may be of interest to the recipient.

The bottom surface may more specifically include advertisement information 114 that is personally directed to the specific recipient 126 of the product 124. For example, if the product 124 is an antibiotic medication, then the advertisement information 114 may include information on medications that the recipient's medical history shows has helped the specific recipient 126 more easily tolerate the antibiotic medication, such as certain specific probiotic medications that had been previously used by the recipient that can be taken in conjunction with the antibiotic medications.

The attachment system 104 is operable to removably attach the label material 102 to the container 122 in an unfolded single sheet single layer configuration. As such the bottom surface area 110 will be positioned between the top surface area 108 and the container 122, once the label material 102 is attached to the container 122. In this attached configuration, the personal information 112 disposed on the top surface area 108 will be visible to the recipient 126, while the advertising information 114 disposed on the opposing bottom surface area 110 is hidden from the view of the recipient 126.

Advantageously, because the additional adverting information 114 is disposed on the opposing bottom surface area 110, the advertising information 114 may not necessarily increase the footprint required for the label material to receive the personal information 112 of the recipient 126 on its top surface area 108. Additionally, because the single layer label material 102 is attached to the container 122 in an unfolded single layer configuration, the privacy label system 100 is less bulky than other label systems that include multiple folded layers, or wherein the label material itself is composed of multiple layers. Such multiple layer label systems may provide a problem for smaller containers, such as envelopes, as they may be sorted in automatic sorting machines during shipment that require a predetermined limit on the thickness of the container. Additionally, such multiple layer label systems may not be able to be practically attached to small containers, such as one inch outside diameter pharmacy prescription vials, during shipment or transport to the recipient 126.

For purposes of clarity, the term "single layer single sheet label material" and its derivatives excludes the multiple layers and/or multiple sheets that would be required in a carbon copy paper system or carbonless coated copy paper system. More specifically, a carbon copy paper system may include a top first sheet of paper (or other label material) that is coated with a transferable ink layer on its bottom side. Alternatively, a carbon copy paper system may disadvantageously include a top first sheet of paper and at least a second sheet of copy paper, wherein the second sheet of copy paper includes the transferable ink layer on its bottom side. When pressure is applied to the top first sheet (as from writing or impact printing), the transferrable ink transfers the writing or printing down to other sheets beneath the top first sheet. The process is often referred to as carbon copying.

With regards to an added second sheet of copy paper in a carbon copy paper system, the additional unnecessary thickness of the second sheet of copy paper may make the privacy label system more susceptible to damage during shipping and handling. Moreover, as will be discussed in greater detail with regards to FIG. 9, any advertising information that may be directly below the second sheet of copy paper may be inadvertently smudged, distorted, printed on, or destroyed by impacts that frequently occur during normal shipping and handling procedures.

Also more specifically, a carbonless copy paper system includes carbonless copy paper (also known as non-carbon paper or NCR paper, wherein NCR is an acronym for; "no carbon required". Carbonless copy paper is a type of layer coated paper designed to transfer information written on the top sheet onto sheets beneath. Carbonless copy paper systems include multiple sheets of carbonless copy paper that are coated with a layer of micro-encapsulated dye or a layer of reactive clay. The back of the top first sheet is coated with a layer of micro-encapsulated dye. A bottom most second sheet, beneath the top sheet, is coated on the top surface with a layer of clay that quickly reacts with the dye to form a permanent mark. Any intermediate sheets are coated with a clay layer on top and a dye layer on the bottom. When the carbonless copy sheets are written on with hand pressure (e.g., ball-point pen) or impact pressure (e.g., typewriter, dot-matrix printer), the pressure causes the micro-capsules to break and release their dye. Since the capsules are so small, the dye dries quickly and the resulting print is very accurate.

Disadvantageously, in prior art carbon copy paper systems and/or carbonless copy paper systems, advertising information, or printed information of any kind, may not be disposed on the entire bottom surface 110 of the top sheet of label material 102 (minus the portion of the bottom surface boundary region 116 that is part of the attachment system 104). This is because the information will be distorted or destroyed when the coated bottom layer of the top sheet transfers information down to the coated lower layers of the lower sheets upon applying hand or impact pressure, such as the signing of the top layer with a pen.

In other words, the top sheet of label material 102 of a prior art carbon copy paper system or prior art carbonless copy paper system is not operable to include printed advertising information, or printed information of any kind, on its entire bottom surface 110 minus that portion of its bottom surface 110 that is part of its attachment system 104. The extra layers of coatings of transferrable ink, or micro-encapsulated dye, or clay in these prior art systems, disadvantageously reduces the amount of bottom surface area of its top sheet that is available for advertising or private information. This reduction of available bottom surface area becomes increasingly problematic for smaller containers, such as small vials 122A or envelopes 122C.

By contrast, with regards to the privacy label system 100 illustrated, for example, in FIGS. 1-3, personal information 112 on the top surface 108 of the single sheet single layer label material 102 and the advertising information 114 on the bottom surface 110 of the label material 102 is advantageously fixed and will not be changed, modified or distorted by impact or hand pressure incurred during normal handling or shipment procedures. Additionally, the entire bottom surface 110, minus the portion of the bottom surface 110 that forms a part of the attachment system 104, is operable to receive fixed printed information, such as advertising information 114, that will not be distorted or destroyed by impacts such as impacts caused by manually signing or machine printing on the top surface 108 with a pen or printer. This is because the bottom surface 110 of the label material 102 is free of any additional layers, such as a prior art transferrable ink layer, a micro-encapsulated dye layer, or a clay layer, that can destroy or distort the printed information on the bottom surface 110 or on any surface that is positioned directly below the ink, dye or clay layers.

Once attached to the container 122 via the attachment system 104, the label material 102 is operable to be removed from the container 122 by the recipient 126 by hand, in order to remove the personal information 112 from the container 122 and to reveal the advertising information 114 to the recipient 126. One example of an attachment system 104 includes a portion of a bottom surface boundary region 116 surrounding the bottom surface area 110 of the label material 102. The attachment system 104 also includes an adhesive layer 118 that is disposed on the portion of the bottom surface boundary region 116. The adhesive layer 118 is operable to removably attach the portion of the bottom surface boundary region 116 to the container 122. The adhesive layer 118 may include such adhesives as pressure sensitive adhesives or the like.

The attachment system 104 may include the entire bottom surface boundary region 116 surrounding the bottom surface area 110, wherein, the entire bottom surface boundary region 116 has the adhesive layer 118 disposed thereon. Alternatively, the attachment system 104 may include only a partial portion of the bottom surface boundary region 116 with the adhesive layer 118 only disposed on the partial portion. For example, the partial portion of the bottom surface boundary layer 116 and adhesive layer 118 may cover only about a third, or a quarter, of the length of each side of the entire bottom surface boundary layer 116.

The privacy label system 100 may also include an optional tab section 120, which may be integrally attached to the label material 102. The tab section 120 may be configured to be pulled by hand to remove the attached label material 102 from the container 122. The tab section 120 may be any appropriate material for pulling and removing the label material 102 from a container 122 (see FIG. 4). For example, the tab section 120 may be composed of paper, plastic or the like.

Figure 4:
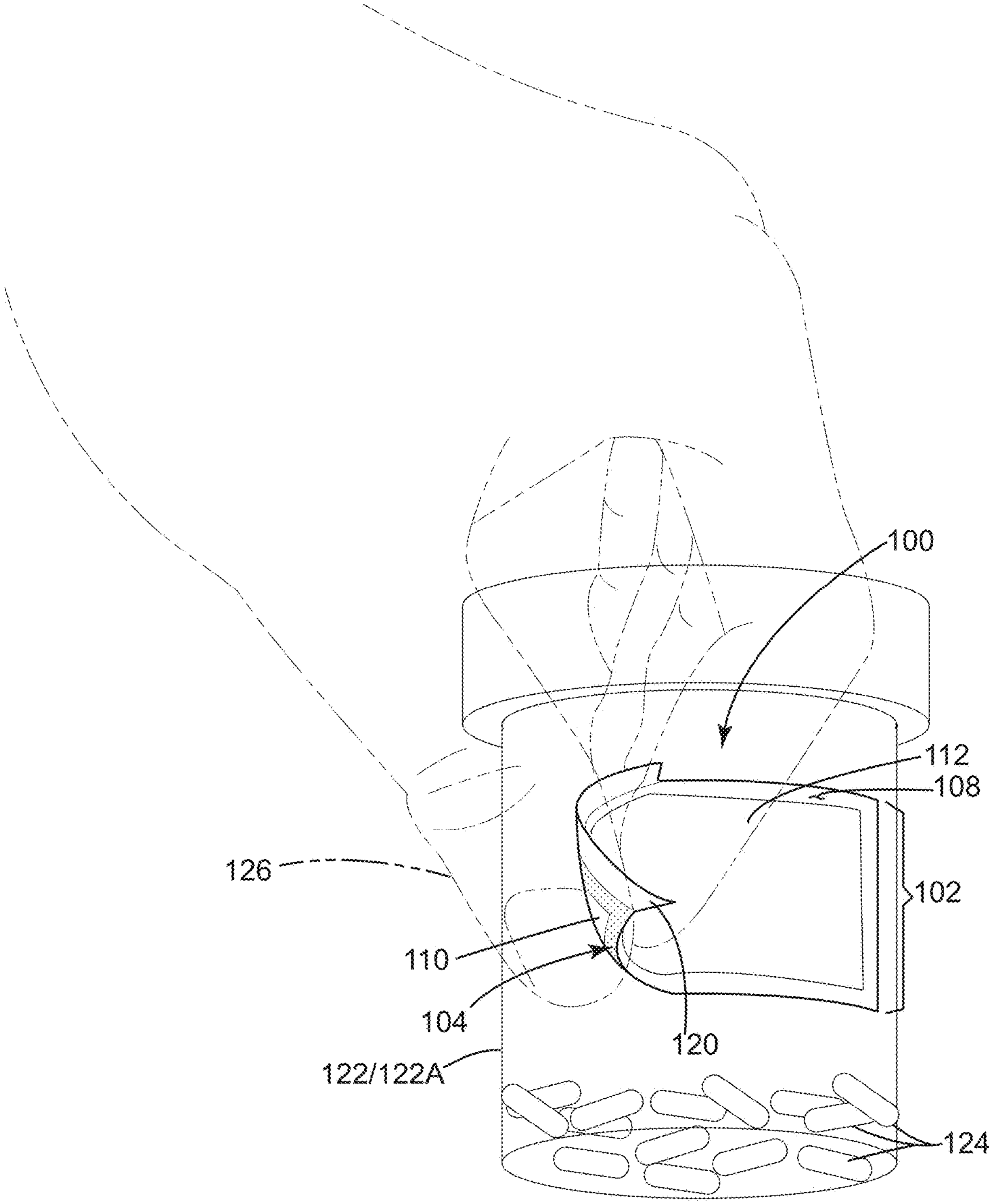
FIG. 4 depicts an example of a perspective view of the privacy label system of FIG. 1 attached to a pharmacy prescription vial, according to aspects describe herein.

Referring to FIG. 4, an example is depicted of a perspective view of the privacy label system 100 attached to a container 122, wherein the container is a pharmacy prescription vial 122A, according to aspects describe herein. The pharmacy prescription vial 122A may contain products 124, which in this case may be pills, or other types of medications, that are meant for use by a recipient 126.

The pharmacy prescription vial 122A may have an outside diameter that is one inch or less. As such, the configuration of the privacy label system 100, which includes a single sheet of label material 102 and an attachment system 104 that include a bottom surface boundary region 116 and an adhesive layer 118, can be made advantageously small enough to fit onto the vial 122A. As illustrated in FIG. 4, the privacy label system 100 may also include a tab section 120 that may be grasped by a hand of the recipient 126 and removed.

Figure 5A:
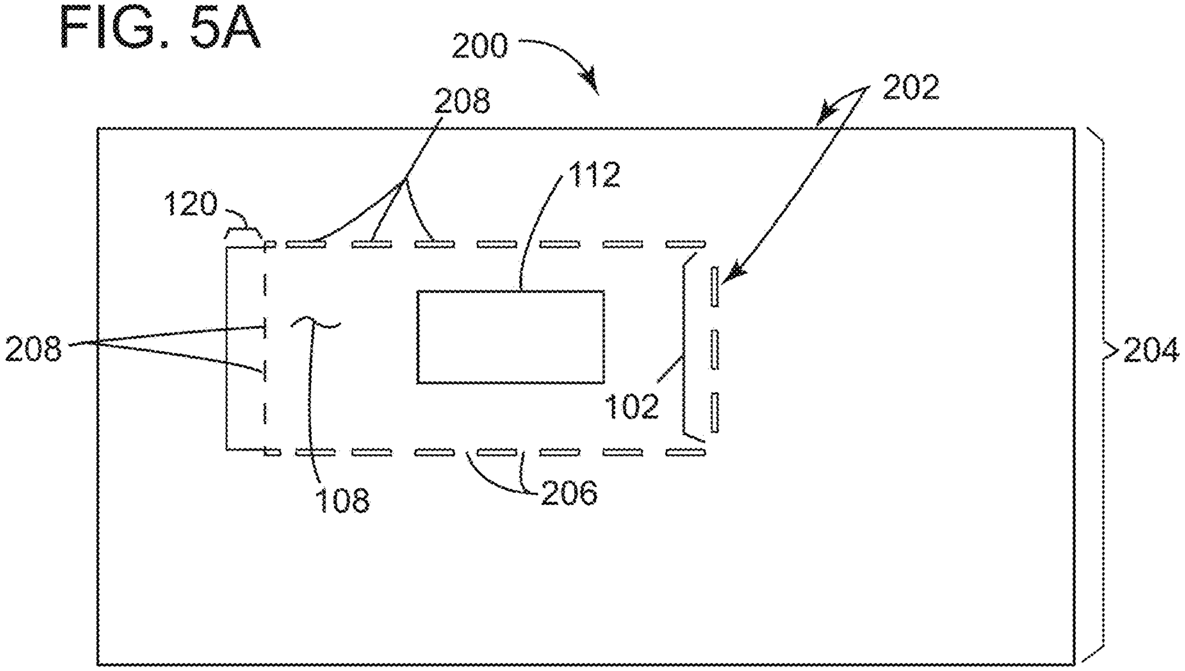
FIG. 5A depicts another example of a top view of a privacy label system with an attachment system that includes a border region and a series of perforations, wherein a perimeter of the label material is attached to the border region between the series of perforations, according to aspects described herein.
Figure 5B:
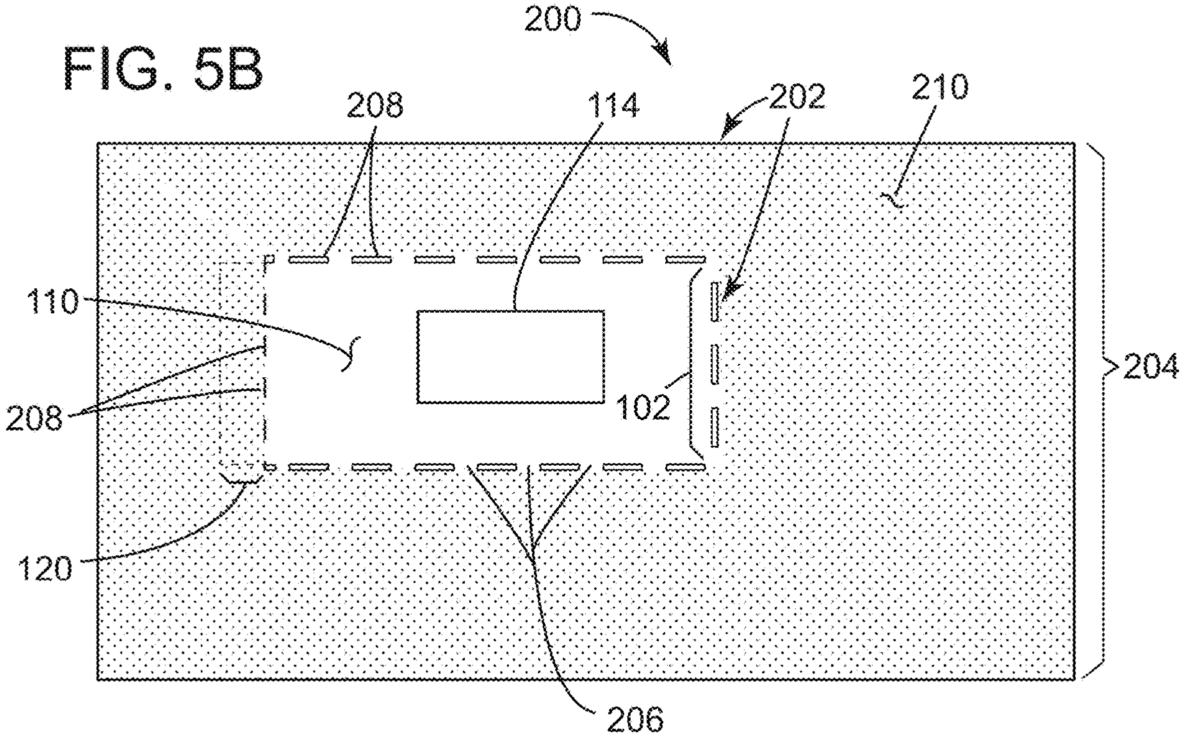
FIG. 5B depicts a bottom view of the privacy label system of FIG. 5A, according to aspects described herein.

Referring to FIGS. 5A and 5B, another example of a top view (FIG. 5A) and a bottom view (FIG. 5B) of a privacy label system 200, according to aspects described herein. As with the privacy label system 100, the privacy label system 200 includes a single sheet of label material 102 configured to be removably attached to a container 122 of a product 124 in an unfolded single layer configuration. The label material 102 includes a top surface area 108 configured to receive personal information 112 of a recipient 126 of the product 124. An opposing bottom surface area 110 is configured to receive advertising information 114 associated with the product 124. An attachment system 202 is operable to removably attach the label material 102 to the container 122 in an unfolded single sheet, single layer configuration such that the bottom surface area 110 is positioned between the top surface area 108 and the container 122, once the label material 102 is attached to the container 122. The label material 102 is operable to be removed from the container 122 by the recipient 126 by hand, in order to remove the personal information 112 from the container 122 and to reveal the advertising information 114 to the recipient 126.

The main difference between the privacy label system 100 as illustrated in FIGS. 1-3 and the privacy label system 200 as illustrated in FIG. 5 is the attachment system 202 of privacy label system 200. The attachment system 202 includes a border region 204 surrounding the label material 102. The border region 204 is attached to a portion of a perimeter 206 of the label material 102 via series of perforations 208. The border region 202 may be any suitable material, such as paper, plastic or the like.

The border region 204 has an adhesive layer 210 disposed thereon, that is operable to attach to the container 122. The adhesive layer 210 may include such adhesives as pressure sensitive adhesives or the like. The adhesive layer 210 may be operable to be more permanently attached to the container 122 than that of adhesive layer 118. That is because the perforations 208 are operable to separate from the perimeter 206 of the label material 102 when the label material 102 is removed from the container 122.

The privacy label system 200 may also include an optional tab section 120, which may be integrally attached to the label material 102. The tab section 120 may be configured to be pulled by hand to remove the attached label material 102 from the container 122. The tab section 120 may be any appropriate material for pulling and removing the label material 102 from the container 122. For example, the tab section 120 may be composed of paper, plastic or the like.

Figure 6:
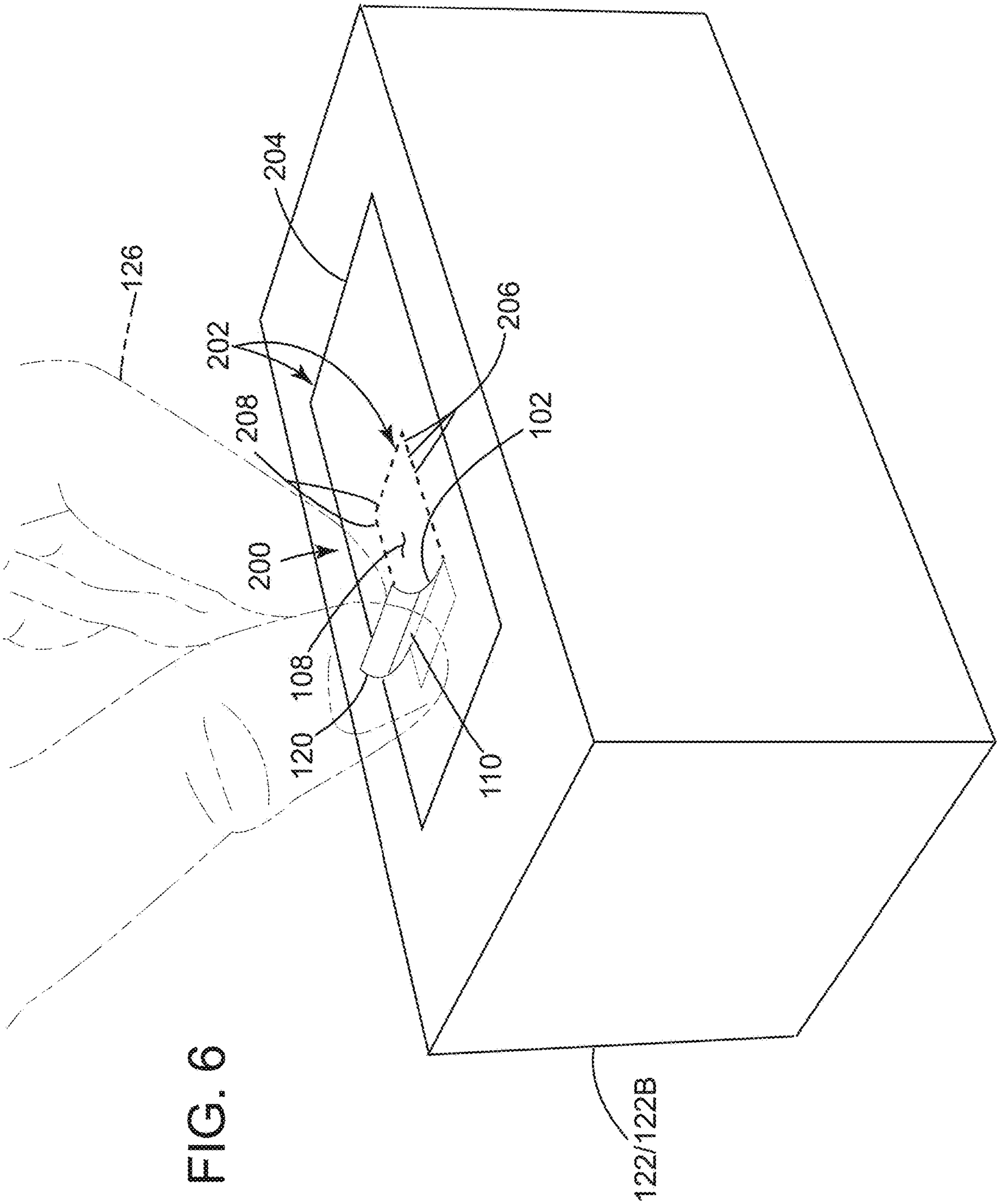
FIG. 6 depicts an example of a perspective view of the privacy label system of FIG. 5A attached to a shipping box, according to aspects described herein.

Referring to FIG. 6, an example is depicted of a perspective view of the privacy label system 200 attached to a container 122, wherein the container is a shipping box 122B, according to aspects described herein. In the example illustrated in FIG. 6, a hand of a recipient 126 is pulling the label material 102 from the container 122B and separating the perforations 208 of the attachment system 202 from the perimeter 206 of the label material 102.

Figure 7:
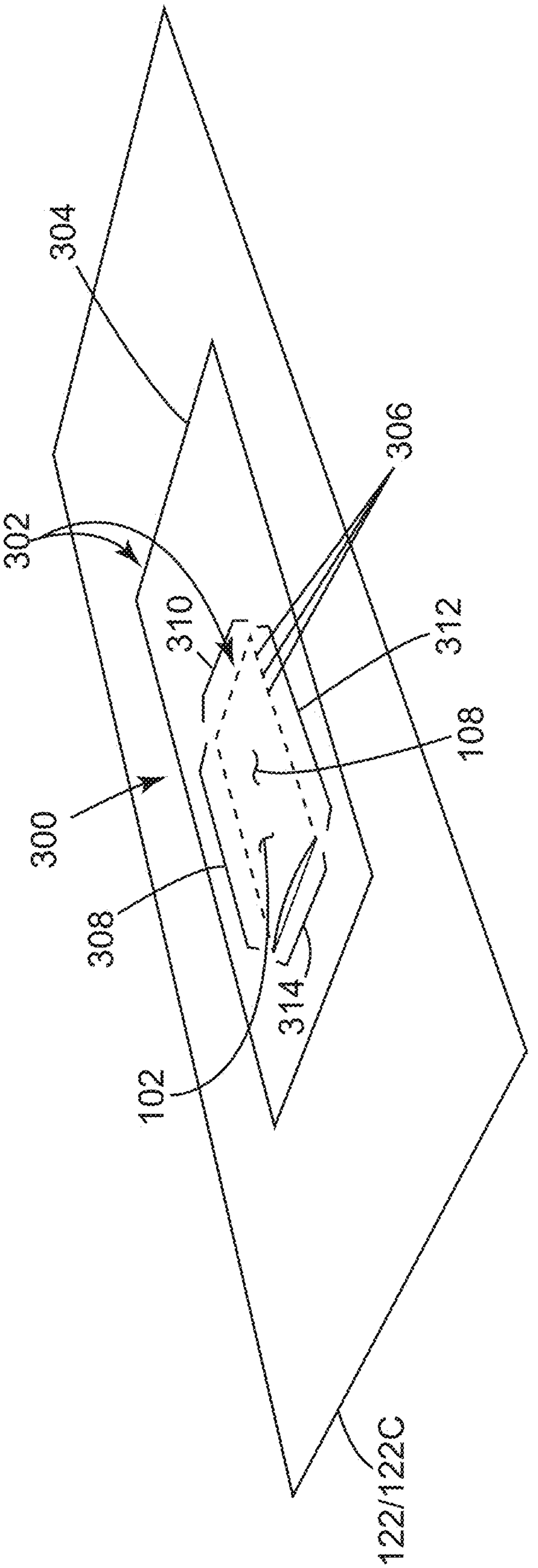
FIG. 7 depicts another example of a perspective view of a privacy label system attached to an envelope, wherein the attachment system that includes a border region attached to a portion of the perimeter of the label material between a series of perforations on three of four sides of the label material, according to aspects described herein.

Referring to FIG. 7, an example is depicted of a perspective view of a privacy label system 300 attached to container 122, wherein the container is an envelope 122C, according to aspects described herein. As with the privacy label systems 100 and 200, the privacy label system 300 includes a single sheet of label material 102 configured to be removably attached to a container 122 of a product 124 in an unfolded single layer configuration. The label material 102 includes a top surface area 108 configured to receive personal information 112 of a recipient 126 of the product 124. An opposing bottom surface area 110 is configured to receive advertising information 114 associated with the product 124. An attachment system 302 is operable to removably attach the label material 102 to the container 122 in an unfolded single layer single sheet configuration such that the bottom surface area 110 is positioned between the top surface area 108 and the container 122, once the label material 102 is attached to the envelope 122C. The label material 102 is operable to be removed from the container/envelope 122/122C by the recipient 126 by hand, in order to remove the personal information 112 from the envelope 122C and to reveal the advertising information 114 to the recipient 126.

The main difference between the privacy label system 100 as illustrated in FIGS. 1-3, the privacy label system 200 as illustrated in FIG. 5 and the privacy label system 300 as illustrated in FIG. 7 is the attachment system 302 of system 300. The attachment system 302 includes a border region 304 that is only attached to a fractional portion of the perimeter 305 of the label material 102 between a series of perforations 306. In the example illustrated in this FIG. 7, the perforations 306 extend along three of four sides of the label material 102. More specifically in this example, the label material 102 is generally rectangular in shape and includes four sides 308, 310, 312 and 314. The perforations 306 attach the label material 102 to the border region 304 along sides 308, 310 and 312 only. The fourth side 314 of the label material 102 is not attached to the border region 304 and has no perforations 306 disposed thereon.

Advantageously, because the fourth side 314 is unattached, it functions as a site wherein a recipient 126 may slip a fingernail under the unattached side 314 and lift the label material 102 off of the envelope 122C. At the same time, the fourth side 314 remains flat against the envelope 122C during shipment, since the label material 102 is held flush against the envelope 122C by the perforations 306 along sides 308, 310 and 312.

Accordingly, the privacy label system 300 is advantageously suitable for small envelopes, such as a size 10 envelope or smaller, which has outside dimensions of four and one eighth (4⅛) inches by nine and one half (9½) inches. Further, privacy label system 300 lays flush against the envelope 122C, so it has no potential snags (such as an extraneous tab section 120). Further the label material 102 of the privacy label system 300 is a single sheet configured in an unfolded single layer to decrease the overall thickness of the envelope during shipment and also decrease the possibility of snagging or jamming when being sorted by automatic sorting machines.

Figure 8:
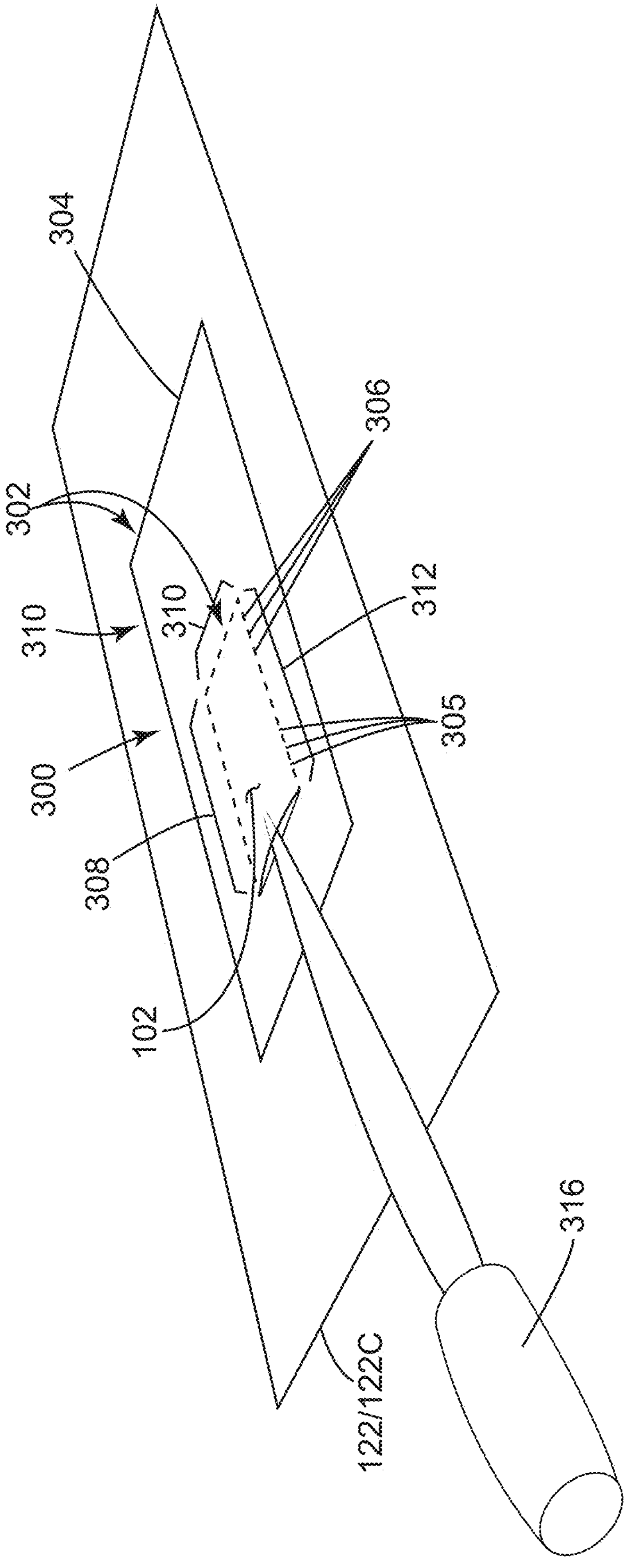
FIG. 8 depicts an example of a perspective view of the privacy label system of FIG. 7, wherein the label material is partially removed from the envelope, according to aspects described herein.

Referring to FIG. 8, an example is depicted of a perspective view of the privacy label system 300, wherein the label material 102 is partially removed from the envelope 122C, according to aspects described herein. The label material 102 may be removed by hand as described herein with reference to FIG. 7. However, as illustrated in the example of FIG. 8, the label material 102 may also be removed by slipping a letter opener 316 under the unattached side 314.

Referring to FIG. 9, an example is depicted of a perspective view of a privacy label system 350, configured to be removably attached to a container, wherein the container is a box 122D, and wherein the privacy label system 350 includes a single layer single sheet top first label material 102 and a single layer single sheet second label material 352 positioned directly adjacent and below the first label material, according to aspects described herein. As with the privacy label systems 100, 200 and 300, the privacy label system 350 includes the single sheet of top first label material 102 configured to be removably attached to a container 122 (in this case box 122D) of a product 124 in an unfolded single layer configuration. The label material 102 includes a top surface area 108 configured to receive personal information 112 of a recipient 126 of the product 124. An opposing bottom surface area 110 is configured to receive advertising information 114 associated with the product 124.

A first attachment system 354 is operable to removably attach the label material 102 to the container 122 in an unfolded single layer single sheet configuration such that the bottom surface area 110 is positioned between the top surface area 108 and the container 122D, once the label material 102 is attached to the box 122D. The first attachment system 354 may be similar to any of the attachment systems disclosed herein. In this case, the first attachment system 354 includes a series of first perforations 358 surrounding a first perimeter 360 of the first label material 102 in a similar fashion to the attachment system of privacy label system 200. The first label material 102 is operable to be removed from the container/envelope 122/122D by the recipient 126 by hand, in order to remove the personal information 112 from the box 122D and to reveal the advertising information 114 to the recipient 126.

The main difference between the privacy label system 350 and the privacy label systems 100, 200 and 300, is that privacy label system 350 includes a single layer single sheet second label material 352 positioned directly adjacent and below the first label material 102. Therefore, a top surface 356 of the second label material 352 abuts against and contacts the bottom surface 110 of the first label material 102, such that no intervening sheets of material are positioned between the first label material 102 and the second label material 352.

The top surface 356 of the second label material 352 is configured to receive advertising information 114 over its entire surface area, which is associated with a product 124 or personally directed to the recipient 126. Accordingly, advertising information 114 may be printed on both the bottom surface 110 of the first label material 102 and the top surface 356 of the second label material 352. Advantageously, once the first label material 102 is removed from the container 122/122D, the advertising information 114 on both label materials 102 and 352 is immediately viewable by a recipient 126. Therefore, by adding the second label material 352 to the privacy label system 300, the area available for advertising information is effectively doubled without increasing the footprint of the privacy label system 350.

Additionally, the thickness of the privacy labeling system is minimally increased by only the thickness of the single layer, single sheet second label material 352, because there are no intervening sheets or layers between the first 102 and second 352 label materials. This minimal increase in thickness helps to keep the privacy label system 350 from becoming problematically thick and, therefore, more susceptible to damage during shipping and handling.

Also, unlike carbon copy paper systems or carbonless coated copy paper systems, the entire bottom surface 110 of the first label material, 102 minus that portion of its bottom surface 110 that is part of its attachment system 104, is operable to receive printed advertising information 114 thereon. Additionally, unlike carbon paper systems or carbonless coated copy paper systems, the entire top surface 356 of the second label material 352 is operable to receive printed advertising information 114, which will not be smudged, printed over or destroyed by impacts caused by normal shipping and handling procedures.

The privacy label system 350 may also include a second attachment system 362 that enables the second label material 352 to be removable attached to the container 122D. The second attachment system 362, may be similar to any of the attachment systems disclosed herein. In the example illustrated in FIG. 9, the second attachment system 362 is similar to the attachment system 302 illustrated in FIGS. 7 and 8. That is, the attachment system 362 includes a series of second perforations 364 on three of four sides of a second perimeter 366 of the second label material 352. The fourth side 368 of the second label material 352 is not attached to anything and has no perforations thereon. Accordingly, the second label material 352 may be removed from the container 122D in much the same fashion that the first label material 102 of FIGS. 7 and 8 is removed (for example by inserting a fingernail or letter opener under the perforation free side 368 and lifting). By being able to remove the second label material 352, the recipient 126 is able to advantageously preserve, protect and/or otherwise keep private, the information 114 printed on the second label material 352.

Though the example of the privacy label system 350 is illustrated in FIG. 9 as being removably attached to a box 122D and having first perforations 358 surrounding the first perimeter 360 of the first label material 102 as being included in the first attachment system 354, the privacy label system 350 can be attached to any appropriate container 122 (e.g., envelopes 122C or pharmacy prescription vials 122A) and can have first (or second) attachment systems that include any of the features of any of the attachment systems described herein. For example the first and second attachment systems 354, 362 of privacy label system 350 may both, or either, include some, or all, of the features of the attachment systems discussed with regards to privacy label systems 100, 200 or 300 (such as adhesive layer 118 as in FIG. 2, or having a label material side 314 with no perforations as in FIG. 7, or the like).

Referring to FIG. 10, an example is depicted of a flow diagram of a method 400 of protecting privacy of a recipient 126 of a product 124, according to aspects described herein. The method begins at 402, which provides a privacy label system 100 having a single sheet of label material 102 configured to be removably attached to a container 122 of a product 124 in an unfolded single layer configuration.

At 404 of method 400, personal information 112 of a recipient 126 of the product 124 is disposed on a top surface area 108 of the label material 108. At step 406, advertising information 110 associated with the product 122 is disposed on an opposing bottom surface area 110 of the label material 102.

At step 408 of method 400, an attachment system 104 of the privacy label system 100 is attached to the container 122. The attachment system 104 removably attaches the label material 102 to the container 122 in an unfolded single layer configuration such that the bottom surface area 110 is positioned between the top surface area 108 and the container 122 once the label material 102 is attached to the container 122. At step 410, if the attachment system 104 includes a bottom surface boundary region 116 with an adhesive layer 118 disposed thereon, then a portion of the bottom surface boundary region 116 of the privacy label system 100 is removably attached to the container 122.

At step 412, the label material 102 of the privacy label system 100 is removed from the container 122 by the recipient 126 by hand, in order to remove the personal information 112 from the container 122 and to reveal the advertising information 114 to the recipient 122. At step 414, if the privacy label system 100 includes a tab section 120, then pulling by hand the tab section 120 of the privacy label system 100 that is attached to the label material 102, in order to remove the attached label material 102 from the container 122.

Referring to FIG. 111 an example is depicted of a flow diagram of a method 500 of protecting privacy of a recipient 126 of a product 124, according to aspects described herein. The method 500 is a continuation of method 400.

The method 500 beings at 502, wherein, if the attachment system 202 includes a border region 204, then the border region 204 of the privacy label system 200 is attached to the container 122. The border region 204 surrounds the label material 102. The border region 204 being attached to a portion of a perimeter 206 of the label material 102 via series of perforations 208. The perforations 208 being operable to separate from the perimeter 206 of the label material 102 when the label material 102 is removed from the container 122.

At step 504 of method 500, if the privacy label system 200 includes a tab section 120, then the tab section 120 of the privacy label system 200 is pulled by hand. The tab section 120 of the privacy label system 200 being attached to the label material 102. At step 506, the perimeter 206 of the label material 102 is separated from the perforations 208 when pulling the tab section 120, in order to remove the label material 102 from the container 122.

At step 508 of method 500, if the privacy label system 300 does not include a tab section 120, then the border region 304 may be attached to three 308, 310, 312 of the four sides 308, 301, 312, 314 of the label material 102 via the series of perforations 306. At step 510, the fourth side 314 of the label material 102 is left unattached to the border region 304. At 512, the unattached fourth side 314 of the label material 102 is pulled to separate the perimeter 206 of the label material 102 from the perforations 306 and remove the label material 102 from the container 122.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A privacy label system comprising:

at least a first sheet of label material and a second sheet of label material each being configured to be removably attached to a container of a product in an unfolded layer configuration;

the first sheet of label material comprising:

a first top surface area configured to receive personal information of a recipient of the product, and an opposing first bottom surface area;

the second sheet of label material comprising:

a second top surface area configured to receive second advertising information associated with the product, and an opposing second bottom surface area;

a first attachment system operable to removably attach the first sheet of label material to the container in an unfolded layer configuration such that the first bottom surface area is positioned between the first top surface area and the container, once the first sheet of label material is attached to the container;

a second attachment system operable to removably attach the second sheet of label material to the container in an unfolded layer configuration such that the second sheet of label material is positioned between the first sheet of label material and the container, once the second sheet of label material is attached to the container; and a first tab section attached to the first sheet of label material, the first tab section configured to be pulled by hand to remove the attached first sheet of label material from the container;

wherein, the first sheet of label material is operable to be removed from the container by the recipient.

2. The privacy label system of claim 1, wherein, the second sheet of label material is operable to be removed from the container by the recipient.

3. The privacy label system of claim 1, wherein the first attachment system comprises a portion of a first bottom surface boundary region surrounding the first bottom surface area, the first bottom surface boundary region having a first adhesive layer disposed thereon that is operable to attach the portion of the first bottom surface boundary region to the container.

4. The privacy label system of claim 1, wherein the first attachment system comprises:

a first border region surrounding the first sheet of label material, the first border region attached to a portion of the first sheet of label material via series of first perforations, and a first adhesive layer disposed on the first border region that is operable to attach to the container.

5. The privacy label system of claim 1, wherein the second attachment system comprises a portion of a second bottom surface boundary region surrounding the second bottom surface area, the second bottom surface boundary region having a second adhesive layer disposed thereon that is operable to attach the portion of the second bottom surface boundary region to the container.

6. The privacy label system of claim 5, wherein second attachment system comprises the entire second bottom surface boundary region surrounding the second bottom surface area, the entire second bottom surface boundary region having the second adhesive layer disposed thereon.

7. The privacy label system of claim 1, wherein the second attachment system comprises:

a second border region surrounding the second sheet of label material, the second border region attached to portion of the second sheet of label material via series of second perforations, and a second adhesive layer disposed on the second border region that is operable to attach to the container.

8. The privacy label system of claim 7, wherein the second series of perforations extend along three of four sides of the second sheet of label material, the fourth side of the second sheet of label material being unattached to the second border region.

9. The privacy label system of claim 1, comprising:

a second tab section attached to the second sheet of label material, the second tab section configured to be pulled by hand to remove the attached second sheet of label material from the container.

10. A method of protecting privacy of a recipient of a product, the method comprising:

providing a privacy label system having at least a first sheet of label material and a second sheet of label material, the first and second sheets of label material each being configured to be removably attached to a container of a product in an unfolded layer configuration;

disposing personal information of a recipient of the product on a first top surface area of the first sheet of label material disposing advertising information associated with the product on either an opposing first bottom surface area of the first sheet of label material or a second top surface area of the second sheet of label material;

attaching a first attachment system of the privacy label system to the container, the first attachment system removably attaching the first sheet of label material to the container in an unfolded layer configuration such that the first bottom surface area is positioned between the first top surface area and the container, once the first sheet of label material is attached to the container;

attaching a second attachment system of the privacy label system to the container, the second attachment system removably attaching the second sheet of label material to the container in an unfolded layer configuration such that the second sheet of label material is positioned between the first sheet of label material and the container, once the second sheet of label material is attached to the container; and pulling by hand a first tab section of the privacy label system that is attached to the first sheet of label material, in order to remove the attached first sheet of label material from the container, in order to remove the personal information from the container and to reveal the advertising information to the recipient.

11. The method of claim 10, comprising:

removing the second sheet of label material of the privacy label system from the container by the recipient.

12. The method claim 10, comprising:

removably attaching a portion of a first bottom surface boundary region of the privacy label system to the container, the first bottom surface boundary region surrounding the first bottom surface area, the first bottom surface boundary region having a first adhesive layer disposed thereon that is operable to removably attach the portion of the first bottom surface boundary region to the container.

13. The method of claim 10, comprising:

attaching a first border region of the privacy label system to the container, the first border region surrounding the first sheet of label material, the first border region being attached to a portion of a perimeter of the first sheet of label material via series of first perforations, wherein the first perforations are operable to separate from the perimeter of the first sheet of label material when the first sheet of label material is removed from the container.

14. The method claim 10, comprising:

removably attaching a portion of a second bottom surface boundary region of the privacy label system to the container, the second bottom surface boundary region surrounding the second bottom surface area, the second bottom surface boundary region having a second adhesive layer disposed thereon that is operable to attach the portion of the second bottom surface boundary region to the container.

15. The method claim 14, wherein second attachment system comprises the entire second bottom surface boundary region surrounding the second bottom surface area, the entire second bottom surface boundary region having the second adhesive layer disposed thereon.

16. The method of claim 10, comprising:

attaching a second border region of the privacy label system to the container, the second border region surrounding the second sheet of label material, the second border region being attached to a portion of a perimeter of the second sheet of label material via series of second perforations, wherein the second perforations are operable to separate from the perimeter of the second sheet of label material when the second sheet of label material is removed from the container.

17. The method of claim 16, wherein the second series of perforations extend along three of four sides of the second sheet of label material, the fourth side of the second sheet of label material being unattached to the second border region.

18. The method of claim 10, comprising:

pulling by hand a second tab section of the privacy label system that is attached to the second sheet of label material, in order to remove the attached second sheet of label material from the container.

* * * * *